United States Patent
Söhngen et al.

(10) Patent No.: US 10,204,714 B2
(45) Date of Patent: Feb. 12, 2019

(54) SHEATHING FOR AN ELONGATED PRODUCT AND USE THEREOF

(71) Applicant: Coroplast Fritz Müller GmbH & Co. KG, Wuppertal (DE)

(72) Inventors: Marcus Söhngen, Wuppertal (DE); Christoph Frigge, Sprockhövel (DE); Anastasios Sarakasidis, Wuppertal (DE)

(73) Assignee: Coroplast Fritz Müller GmbH & Co. KG, Wuppertal (DE)

( * ) Notice: Subject to any disclaimer, the term of this patent is extended or adjusted under 35 U.S.C. 154(b) by 0 days.

(21) Appl. No.: 15/027,586

(22) PCT Filed: Sep. 29, 2014

(86) PCT No.: PCT/EP2014/070740
§ 371 (c)(1),
(2) Date: Apr. 6, 2016

(87) PCT Pub. No.: WO2015/052022
PCT Pub. Date: Apr. 16, 2015

(65) Prior Publication Data
US 2016/0247601 A1    Aug. 25, 2016

(30) Foreign Application Priority Data
Oct. 10, 2013   (DE) .......... 10 2013 111 219

(51) Int. Cl.
*H01B 7/02* (2006.01)
*B60R 16/02* (2006.01)
*H01B 13/06* (2006.01)

(52) U.S. Cl.
CPC ....... *H01B 7/0241* (2013.01); *B60R 16/0215* (2013.01); *H01B 13/06* (2013.01)

(58) Field of Classification Search
None
See application file for complete search history.

(56) References Cited

U.S. PATENT DOCUMENTS 2,399,183 A    4/1946  Harrison
2,416,063 A    2/1947  Nicholls
(Continued)

FOREIGN PATENT DOCUMENTS

CN    102608714 A     7/2012
DE    195 09 349 C1   11/1996
(Continued)

OTHER PUBLICATIONS

PCT International Search Report—dated Mar. 26, 2015.
PCT International Search Report—dated Apr. 21, 2016—English Translation.

*Primary Examiner* — Dimary S Lopez Cruz
(74) *Attorney, Agent, or Firm* — Brinks Gilson & Lione

(57) ABSTRACT

A sheathing for an elongated product, including an electrical cable set, having a foldable, wrappable, arching or bendable carrier having a middle region provided for lying against the elongated product and is delimited on both sides by an edge region. In order to ensure an attachment, which can be carried out with reduced effort during the mounting of the sheathed product, at least one hole is located in each edge region, wherein a hole in the one edge region is associated with a hole in the other edge region, such that the holes coincide by a folding of the carrier along or parallel to a main axis (X-X) that extends through the middle region of the carrier, or by an arching or bending of the carrier about an axis (Y-Y) parallel to the main axis (X-X).

9 Claims, 5 Drawing Sheets

(56) References Cited

U.S. PATENT DOCUMENTS

| | | | |
|---|---|---|---|
| 2,790,614 A | 4/1957 | Miller | |
| 3,486,727 A | 12/1969 | Timms | |
| 4,442,154 A * | 4/1984 | Fortsch | B29C 61/10 |
| | | | 138/156 |
| 4,532,168 A * | 7/1985 | Steele | B29C 61/0633 |
| | | | 138/166 |
| 4,626,458 A * | 12/1986 | Pithouse | B29C 61/006 |
| | | | 156/86 |
| 4,631,098 A * | 12/1986 | Pithouse | B29C 61/0633 |
| | | | 156/86 |
| 4,761,194 A * | 8/1988 | Pithouse | B29C 61/0633 |
| | | | 156/84 |
| 4,877,660 A * | 10/1989 | Overbergh | B29C 61/0658 |
| | | | 138/110 |
| 4,900,596 A * | 2/1990 | Peacock | B29C 53/36 |
| | | | 138/110 |
| 4,952,438 A * | 8/1990 | Kipfelsberger | B29C 61/0633 |
| | | | 428/68 |
| 5,482,087 A * | 1/1996 | Overbergh | B29C 61/06 |
| | | | 138/103 |
| 5,843,542 A * | 12/1998 | Brushafer | F16L 11/02 |
| | | | 428/36.1 |
| 6,960,380 B2 * | 11/2005 | Buekers | H02G 15/003 |
| | | | 174/76 |
| 6,963,031 B2 * | 11/2005 | Gladfelter | F16L 3/26 |
| | | | 174/74 A |
| 8,925,592 B2 * | 1/2015 | Itoh | B60R 16/02 |
| | | | 138/123 |
| 2001/0011600 A1 | 8/2001 | Daume | |
| 2002/0053392 A1 * | 5/2002 | Lodde | C09J 7/045 |
| | | | 156/213 |
| 2004/0048505 A1 | 3/2004 | Daume | |
| 2004/0180169 A1 * | 9/2004 | Slabe | B32B 27/10 |
| | | | 428/40.1 |
| 2012/0160540 A1 | 6/2012 | Devouge | |
| 2015/0144395 A1 * | 5/2015 | Tanaka | H02G 3/22 |
| | | | 174/668 |

FOREIGN PATENT DOCUMENTS

| | | |
|---|---|---|
| EP | 1 186 817 A2 | 3/2002 |
| FR | 1 449 352 | 10/1965 |
| JP | 9-135523 | 5/1997 |

* cited by examiner

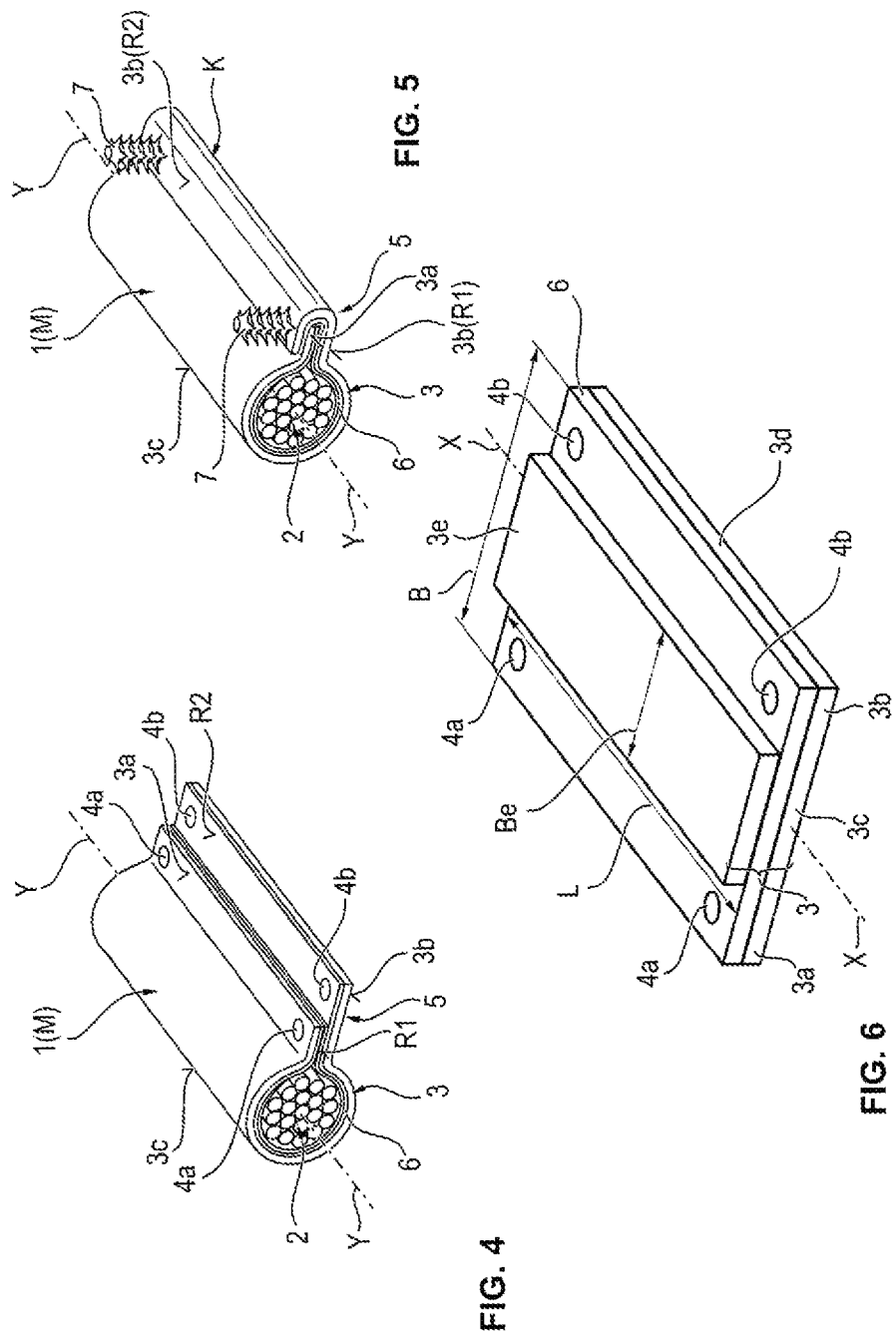

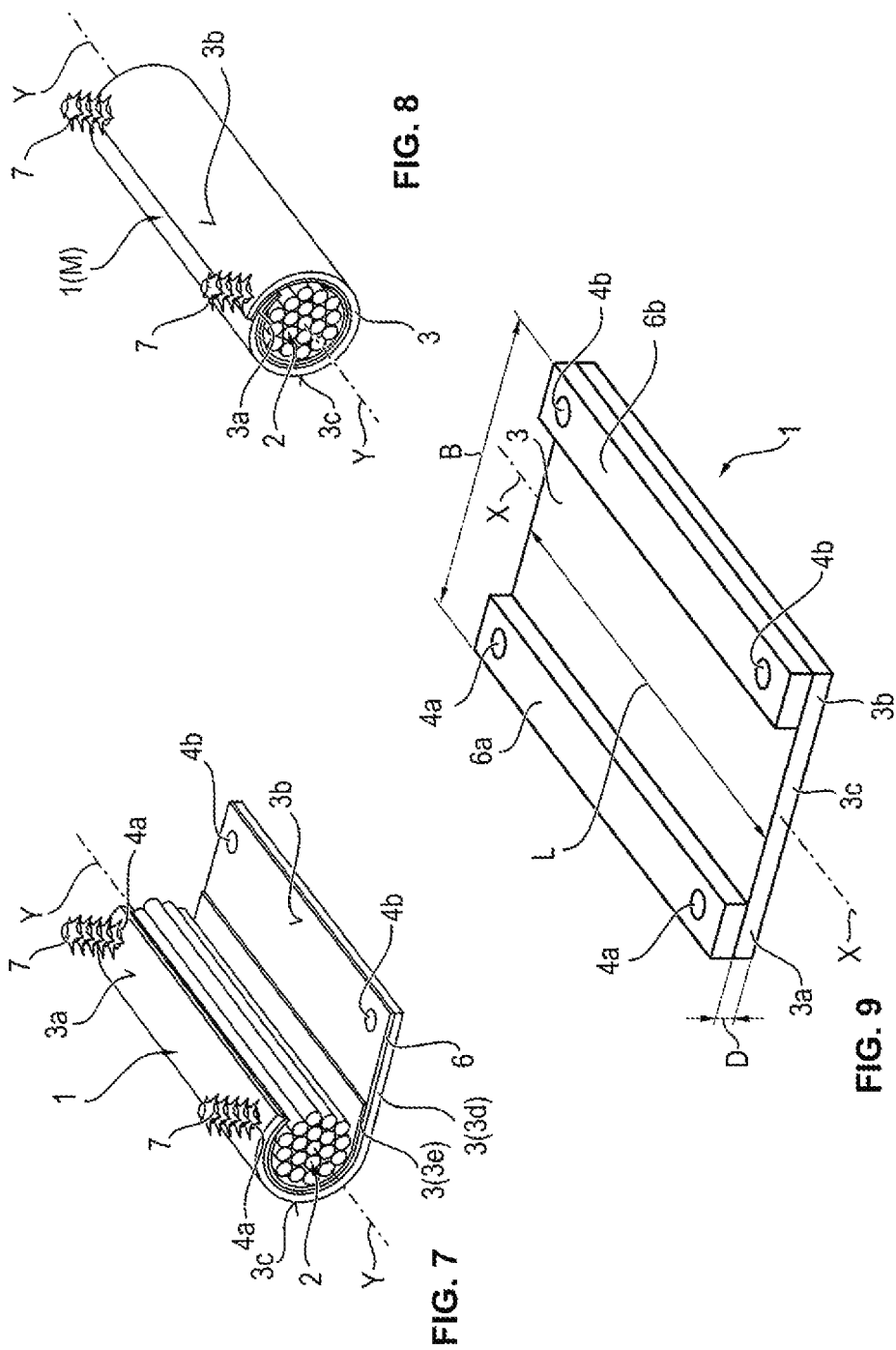

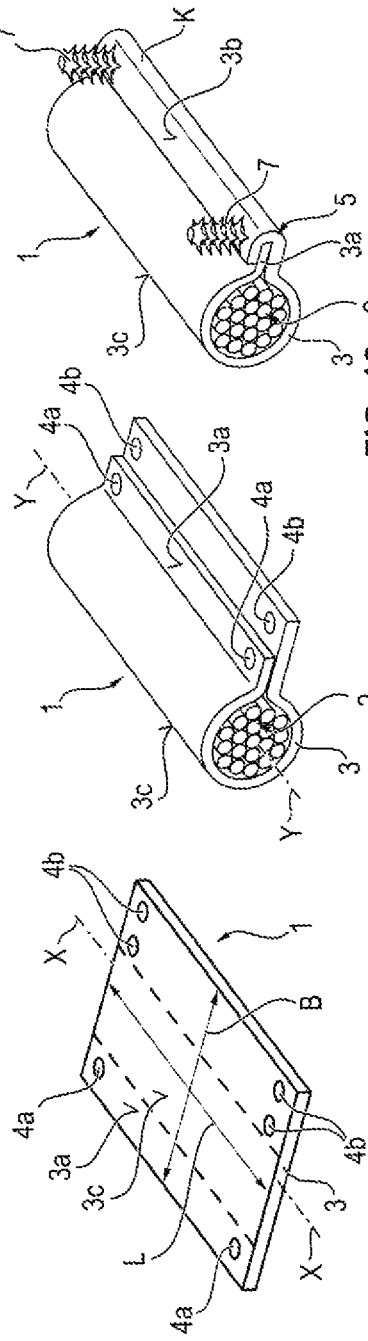
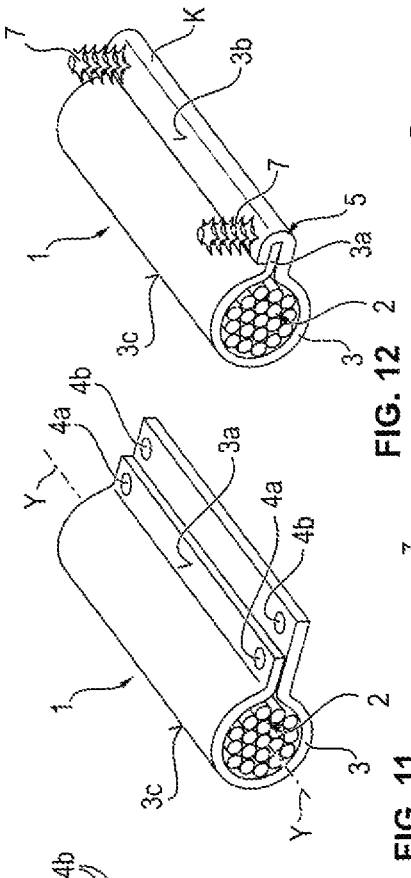
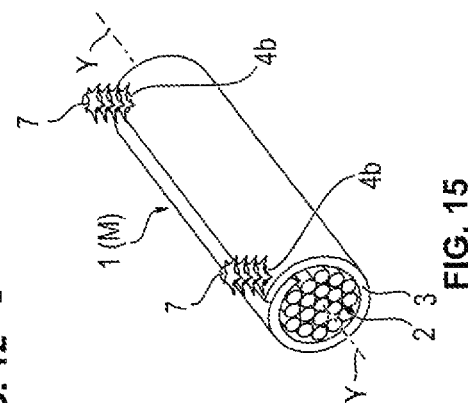
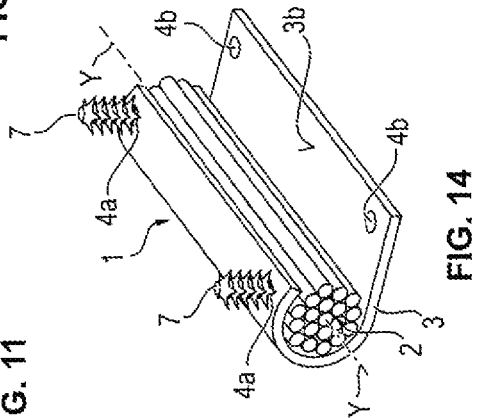
FIG. 10
FIG. 11
FIG. 12
FIG. 13
FIG. 14
FIG. 15

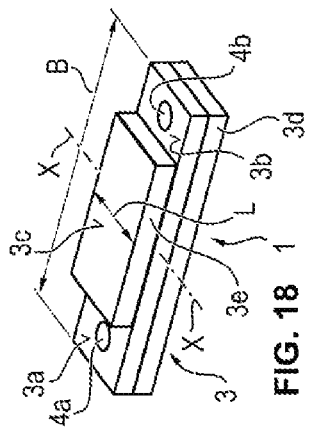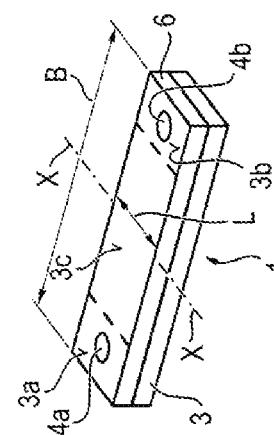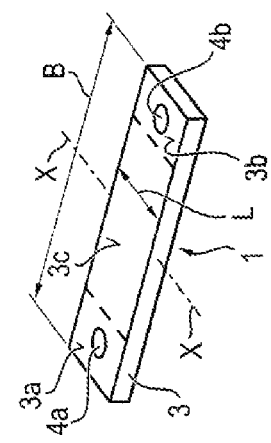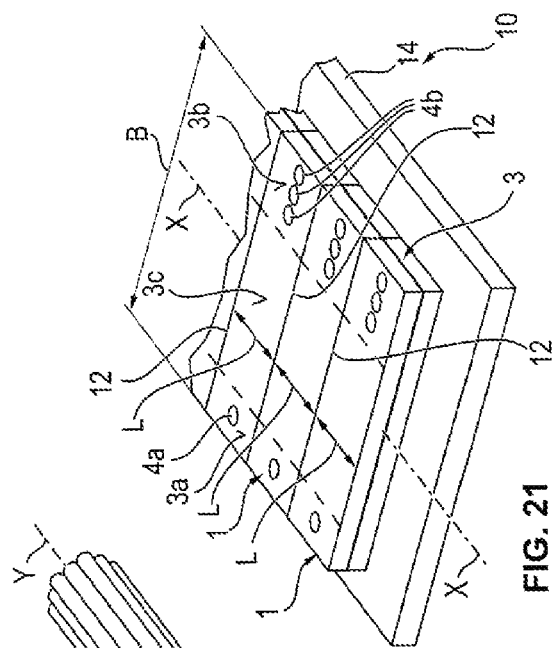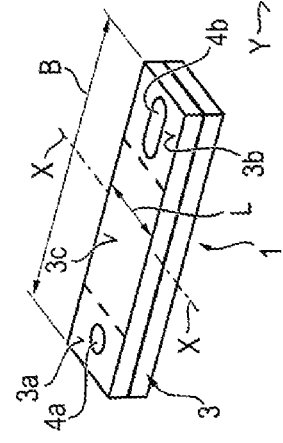

SHEATHING FOR AN ELONGATED PRODUCT AND USE THEREOF

CROSS REFERENCE TO RELATED APPLICATIONS

This application claims priority to German Patent Application No. 10 2013 111 219.6, filed Oct. 10, 2013 and PCT International Application No. PCT/EP2014/070740, filed on Sep. 29, 2014.

FIELD OF THE INVENTION

The invention relates to a sheathing for an elongated product, particularly for an electrical cable set comprising a foldable, windable, bendable, or at least flexible carrier having a middle region which is used for lying against the product to be sheathed and is delimited on both sides by an edge region. Furthermore, the invention relates to the use of such a sheathing means.

BACKGROUND

In the automotive sector, cable harnesses are often wrapped with adhesive tape, wherein mainly textile adhesive tapes have assumed numerous additional functions, such as protecting the cables from abrasion or damping of valve or vibration noise, apart from the pure bundling function.

As an alternative to helical wrapping of cable sets, today numerous systems of longitudinal sheathing are offered, wherein at least in part adhesive tapes find application as sheathing of the above-named type. For instance, DE 295 10 907 U1 describes an inner-side adhesive cable jacket with laterally projecting closure; DE 196 11 586 A1 a foil sleeve with one-sided, non-projecting adhesive closure; EP 1 000 127 B1 full-surface adhesive products for longitudinal sheathing; EP 1 312 097 B1 and EP 1 300 452 B1 sleeves with in each case at least one narrow, laterally projecting closure adhesive tape strip; DE 102 02 454 A1 a sheath made from two separate tapes, of which at least one is an adhesive tape; EP 1 723 210 B1 a double-layer abrasion protection tape suitable for longitudinal adhesion; EP 1 739 148 A2 a sleeve with outer-side adhesive; and EP 2 034 576 A2 a double-layer sleeve with two adhesive lateral strips. Of the above-named products, especially those that have a largely adhesive-free inner side are advantageous in the manufacture of highly flexible sheaths for large cable-set diameters. This is referenced for example in the cited EP 1 315 781 B1, wherein an inner-side adhesive-free helical wrapping is described.

In order to be able to lay the possibly already sheathed cable sets in a machine or an automobile in a defined manner, they must be fastened to the body. As a rule this is done with clips that are attached to the cable set, which for their part are inserted in bores in the body. These clips are fastened to the cable set in a known manner by two additional wrappings of narrow adhesive tape. This is comparatively expensive and also brings with it the danger of so-called flagging, that is, that the ends of the adhesive tape become detached due to incorrect installation and protrude from the sheathing.

It is the object of the present invention to provide a sheathing of the above-named type, which on the one hand fulfills the function of the sheathing, and at the same time on the other hand both assures a fastening performable with reduced effort during installation of the encased product, and effectively prevents detachment of the adhesive tape ends in the installed state.

According to the invention this is achieved in that there is at least one hole in each edge region of the sheathing, wherein one hole in the one edge region is respectively associated with one hole in the other edge region in such a way that the holes can be caused to coincide with one another due to folding of the carrier along or parallel to a main axis extending through the middle region of the carrier or due to bending or flexing of the carrier about an axis spaced from the carrier extending parallel to this main access.

Due to this invention a sheathing of the elongated product is thus advantageously created that simultaneously offers the possibility of fastening of the product to be sheathed or already sheathed with minimal effort, in particular of cable sets in automobile manufacture. Clips or similar fastening, such as, for example, those needed for fastening of cable sets in an automobile body, which up until now were wrapped in an expensive manner separately on a possibly already sheathed cable harness, can now advantageously be directly integrated according to the invention into the sheathing, by being routed through prepared holes, initially through one of the holes in the one edge region and then during installation through the corresponding hole in the other edge region, so that in the installed state in each case a clip is run through a pair of holes associated with each other.

The invention can therefore be used advantageously both for manufacture of longer sleeves, wherein the function of protection of the product to be sheathed plays a significant role, as well as for short sheathing that serves only for fastening, which can also be designated as clamps and will be so designated hereinafter.

A further advantage of the invention consists in that it can be combined with all of the above-mentioned presently offered diverse known systems for longitudinal sheathing, wherein the sheathing according to the invention preferably can be configured as an adhesive tape—at least as a tape that is adhesive in sections. Preferably here a full-surface or discontinuous adhesive layer consisting of a pressure-sensitive adhesive can be used at least on one side.

Since the combinable fastener for fastening to the sheathing according to the invention in the envisioned manner, in particular the clips, if they are not spaced too far apart, can simultaneously be used for closure of the sheathing, it is possible in a specific embodiment to dispense entirely with the closing effect of an adhesive layer in a sheathing according to the invention.

Hence with use of a largely adhesive-free inner side, there is a possibility of manufacturing highly flexible sheathing both for small as well as for large cable-set diameters. For simple fitting of the sheathing according to the invention to various diameters of the elongated product, it can be advantageously provided that at least one of the holes forming the pair is designed as an elongated hole, or that a hole in the one edge region is associated with a plurality of mutually offset holes in the other edge region, so that using a clip, a belt-like closure of the sheathing is made possible.

It is also possible to use various embodiments of strip-layered carrier materials when these are provided with holes according to the invention through which the clips required for fastening can be inserted. In particular, exclusively lateral fastening lugs optionally present on the fastener according to the invention can advantageously be provided with the adhesive layer.

It can universally be used with textile adhesive tapes, foil-adhesive tapes and/or adhesive tapes with a backing, the invention permits further desired additional functions to be imparted, according to the existing demand profile, to a sheathing according to the invention in addition to the bundling function and the fastening function. Various properties such as temperature resistance, abrasion protection, or noise damping may be in the foreground.

For determination of suitability for a specific demand profile, testing of adhesive tapes for wrapping of cable sets in the automobile industry usually is carried out in accordance with comprehensive standards, as summarized for example in LV 312 (1/2009-LV312-1 regarding adhesive tapes; LV 312-2 regarding longitudinal sheathings) as joint testing guidelines of the firms Audi, BMW, DC, and VW.

Thus regarding thermal resistance, in LV 312 the classification in Table 1 below is provided.

TABLE 1

Temperature classes according to LV 312

| Class | Continuous service temperature, $T_U$ to $T_O$ in ° C. | Short-term temperature $(T_O + 25)$ ° c. | Temperature for thermal overload $(T_O + 50)$ ° C. |
|---|---|---|---|
| A | −40 to 85 | 110 ± 2 | 135 ± 3 |
| B | −40 to 100 | 125 ± 3 | 150 ± 3 |
| C | −40 to 125 | 150 ± 3 | 175 ± 3 |
| D | −40 to 150 | 175 ± 3 | 200 ± 3 |

In addition, the division into various temperature classes is made on the one hand according to LV 312 based on their compatibility with different wiring, while on the other hand consideration is given to the closure tightness of the protective system at elevated temperatures. The latter is substantially improved by the invention by the presence of fastening inserted through the holes.

When UV cross-linked acrylate adhesives with high temperature resistance are used as the pressure-sensitive adhesive in the adhesive layer for the elongated product in the context of the invention, sheathing can be obtained that can be used under normal bending stress, that is in particular for a bending stress that occurs when cable sets are laid in an automobile, up to temperature class D according to Table 1 above. In principle, however, the use of rubber-based adhesives is also possible when only a lower temperature resistance is required.

Also as regards noise damping behavior, LV 312 for cable protection systems, as they can be provided by the sheathing according to the invention, provides for classification into five classes. These are reproduced in Table 2 below.

TABLE 2

Noise damping classes according to LV 312

| Noise damping class | Requirement |
|---|---|
| A—no noise damping | 0 to 2 dB (A) |
| B—slight noise damping | >2 to 5 dB (A) |
| C—medium noise damping | >5 to 10 dB (A) |
| D—high noise damping | >10 to 15 dB (A) |
| E—very high noise damping | >15 dB (A) |

Using a suitable carrier design, for example by using fleece materials in the carrier, which may also possibly be designed two-layer or multi-layer, it is possible that a sheathing produced with a sheathing according to the invention can achieve at least the noise reduction class C, preferably even class D according to LV 312.

As regards abrasion resistance, LV 312 provides the classification shown in Table 3 below. Here a mandrel with a diameter of 5 mm is used for testing.

TABLE 3

Abrasion classes according to LV 312

| Abrasion class | Requirement (number of strokes) |
|---|---|
| A—no abrasion protection | <100 |
| B—slight abrasion protection | 100-499 |
| C—medium abrasion protection | 500-999 |
| D—high abrasion protection | 1000-4999 |
| E—very high abrasion protection | 5000-14999 |
| F—extremely high abrasion protection | 15000-29999 |
| G—abrasion protection for special applications | ≥30000 |

Selection of the suitable design as well as suitable materials for the carrier, which for example can preferably be comprised of a fabric made from polyethylene terephthalate (PET) or polyamide (PA), can ensure that a sheathing according to the invention can achieve at least abrasion class C, preferably class D according to LV 312.

As further tests of importance in application technology, the described guideline, which in particular has the nature of a delivery specification or standard, for example testing methods are also described for the compatibility of adhesive tapes with electrical automotive wiring, as well as for chemical resistance, fogging and flagging behavior, and radiant heat protection.

Due to the possibility of dispensing with the use of the additional narrow closure strips or the use of additional adhesive tape with the known wide sleeve sheathing, with a sheathing according to the invention, not only is simpler manufacture possible, but the sheathing material also assures improved strength of the closure.

In sheathing according to the invention with special suitability required for radiant heat protection, a backing with at least one backing layer that is comprised of a metal material can preferably be used without negative effects with regard to the ends of the sheathing material possibly protruding after installation.

BRIEF DESCRIPTION OF THE DRAWINGS

Further advantageous design features of the invention are contained in the dependent claims and the following description. The invention is explained in more detail using a plurality of inventive exemplary embodiments illustrated by the accompanying drawings:

FIG. 4 shows in perspective view the second embodiment of the inventive sheathing with an elongated product sheathed thereby in a first installed state, FIG. 5 shows in perspective view the second embodiment of the inventive sheathing with an elongated product sheathed thereby in a second installed state, FIG. 6 shows in perspective view a third embodiment of an inventive sheathing, FIG. 7 shows in perspective view the third embodiment of the inventive sheathing with an elongated product sheathed thereby in a first installed state, FIG. 8 shows in perspective view the third embodiment of the inventive sheathing with an elongated product sheathed thereby in a second installed state, FIG. 9 shows in perspective view a fourth embodiment of an inventive sheathing, FIG. 10 shows in perspective view a fifth embodiment of an inventive sheathing, FIG. 11 shows in perspective view the fifth embodiment of the inventive sheathing with an elongated product sheathed thereby in a first installed state, FIG. 12 shows in perspective view the fifth embodiment of the inventive sheathing with an elongated product sheathed thereby in a second installed state, FIG. 13 shows in perspective view a sixth embodiment of an inventive sheathing, FIG. 14 shows in perspective view the sixth embodiment of the inventive sheathing with an elongated product sheathed thereby in a first installed state, FIG. 15 shows in perspective view the sixth embodiment of the inventive sheathing with an elongated product sheathed thereby in a second installed state, FIGS. 16 to 19 show in perspective view a seventh, eighth, ninth, and tenth embodiment of an inventive sheathing, FIG. 20 shows in perspective view the tenth embodiment of the inventive sheathing with an elongated product sheathed thereby, FIG. 21 shows in perspective view an inventive tape containing a plurality of sheathing in an eleventh embodiment.

DETAILED DESCRIPTION

With respect to the following description it is expressly emphasized that the invention is not limited to the exemplary embodiment and here also not limited to all or a plurality of features of the described feature combinations. Rather each individual partial feature of an exemplary embodiment, even separate from all other partial features described in connection therewith, can also have inventive significance on its own and in combination with any other features of another exemplary embodiment.

In the figures of the drawings, identical and analogous components are also always provided with the same reference numbers so that as a rule they are also each only described once.

Figure 1:
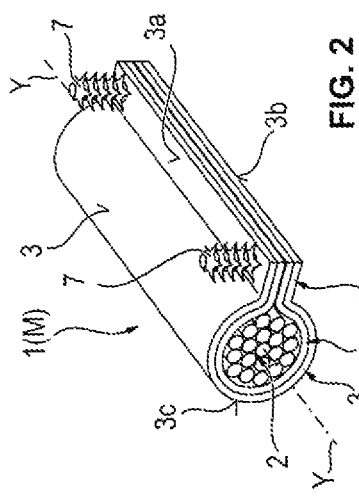
FIG. 1 shows in perspective view a first embodiment of an inventive sheathing.
Figure 2:
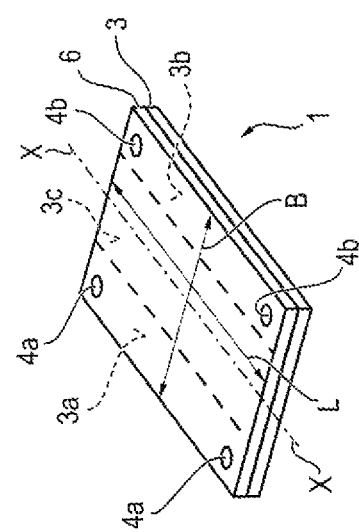
FIG. 2 shows in a perspective view the first embodiment of the inventive sheathing with an elongated product sheathed thereby.

As initially illustrated by FIGS. 1 and 2, which show a first embodiment of the invention, a sheathing 1 according to the invention for an elongated product 2—in particular an electrical cable set is depicted as such—comprises a windable carrier 3.

In the first embodiment, the carrier 3 is in a single layer, for example made from a foil layer or a layer of a textile composite fabric, but as additional embodiments show it can also be designed with two or multiple layers, wherein it then comprises at least one layer formed from a metallic or plastic foil, a fabric, knitted material, or a fleece material.

The carrier 3 has a middle region 3c, which—in particular exclusively—is used for lying against the product 2 to be sheathed, and is delimited on both sides by an edge region 3a, 3b.

In the installed state, as shall be disclosed in detail below, in various embodiments of the invention the sheathed product 2 can also rest in the edge regions 3a, 3b, but this is only optional. FIG. 1 shows an embodiment wherein the sheathed product 2 does not rest in the edge regions 3a, 3b. FIG. 2 shows that instead the two edge regions 3a, 3b in the installed state together form a fastening lug laterally adjacent to the middle region 3c of the carrier 3. Similarly configured or analogous fastening lugs 5 may also be seen in FIGS. 5 and 12.

According to the invention, in each edge region 3a, 3b there is at least one hole 4a, 4b. Here one hole 4a in the one edge region 3a is associated with one hole 4b in the other edge region 3b such that by a folding of the carrier 3 along a main axis X-X extending through the middle region 3c of the carrier 3, or by bending of the carrier 3 about an axis Y-Y spaced from the carrier 3 and extending parallel to this main axis X-X, the holes 4a, 4b can be caused to coincide with one another, as FIG. 2 shows.

The main axis X-X extending through the carrier 3 is shown in FIG. 1; the axis Y-Y spaced from the carrier 3 and extending parallel thereto is shown in FIG. 2. The parallel axis Y-Y here simultaneously forms the middle axis Y-Y through the longitudinal extension of the product 2 which is to be sheathed or is already sheathed.

The holes 4a, 4b can be punch holes, which are simpler in terms of manufacturing technology and therefore preferred.

Specifically the first embodiment of the sheathing according to the invention in each case in each edge region 3a, 3b has two holes 4a, 4b, which form pairs 4a/4b with the holes 4b, 4a associated with them in an axisymmetric manner in the other edge region 3b, 3a.

Depending on the length of the product 2 to be sheathed or on the desired closure density in the longitudinal direction Y-Y of the product 2, also in each case more than two hole pairs 4a/4b can be provided in the edge regions 3a, 3b, wherein their spacing can be variably selected.

In the first embodiment, a length L of the sheathing 1 extending in the direction of the main axis X-X is longer than a breadth B of the sheathing running obliquely to the direction of the main axis X-X, whereby the sheathing 1 can form a sleeve M for the elongated product 2. This is also the case in the second through fifth embodiment of the invention, and is expressed in FIGS. 2, 4, 5, 8, 11, 12, and 15 by a reference number M in parentheses behind the reference number 1 in the drawing.

The first embodiment of the invention also concerns a full-surface adhesive sheathing 1 thus an adhesive tape or at least an adhesive tape section. The carrier here is coated on one side over the full surface with an adhesive layer consisting of a pressure sensitive adhesive.

As mentioned at the outset, the pressure-sensitive adhesive can be a rubber adhesive or preferably an acrylate adhesive, especially preferably a UV cross-linked acrylate adhesive. The adhesive layer 6 can have a surface weight in the range of 20 g/m$^2$ to 250 g/m$^2$, wherein values in the range of 50 g/m$^2$ to 140 g/m$^2$ are preferred, and values in the range of 60 g/m$^2$ to 110 g/m$^2$ are especially preferred for textile carriers 3. For carriers 3 made from foils, lower surface weights of the adhesive layer 6 in the range of 20 g/m$^2$ to 70 g/m$^2$ are especially preferred.

The pressure-sensitive adhesive here can advantageously have a chemical composition such that when a slight pressure is applied to the regions of the self-adhering adhesive layer 6 lying upon one another in the fastening lug 5, which regions are located in the edge regions 3a, 3b of the carrier 3, with dissolution of the boundary surfaces and complete coalescence of the adhesive layer 6, a homogenous pressure-sensitive adhesive mass is formed in the lateral fastening lug 5.

Since there are similar adherents in the adhesive bond thus arising, in this case one speaks of the onset of auto-adhesion. By of an accordingly selectable chemical composition of the pressure-sensitive adhesive, this auto-adhesion bond is transformed, however, into a cohesion bond of the adhesive layers in the presence of a slight pressure. The adhesive layers located on the tape-like carrier are "welded" together. This "self-welding" can be understood as intensive micromechanical interlocking at the molecular level. In this process the former boundary layers are dissolved, and the adhesive layers joined to one another form a homogenous mass. An optimally strong adhesive bond is thereby formed with significant processing advantages.

Based on the prepared holes 4a, 4b, through which—as shown initially in FIG. 2, but subsequently also in FIGS. 5, 7, 8, 12, 14, 15, and 20 a fastener 7, such as fastening clips, can be inserted, with the sheathing 1 according to the invention a longitudinal sheathing (sleeve M) can be created for the elongated product 2, which using a special embodiment already contains the possibility of a simple fastening to the fastener 7 on another component, for example a motor vehicle body. The necessity of a later fastening of fastener 7 to the longitudinal sheathing M by additional adhesive tape or the like thus no longer applies.

For manufacture of the sheathing, the carrier 3 is bent about the axis Y-Y running parallel to the main axis X-X, wherein the Y-Y axis is identical to the longitudinal axis of the elongated product 2. The holes 4a, 4b associated with one another in the edge regions 3a, 3b, are hereby caused to coincide with one another and the fastener 7 is inserted through the holes 4a, 4b. The size and shape of the holes 4a, 4b should here be fitted to the size and shape of the fastener 7, so that the fastener 7 is held in the holes 4a, 4b in an interference-fit and friction-fit manner.

Figure 3:
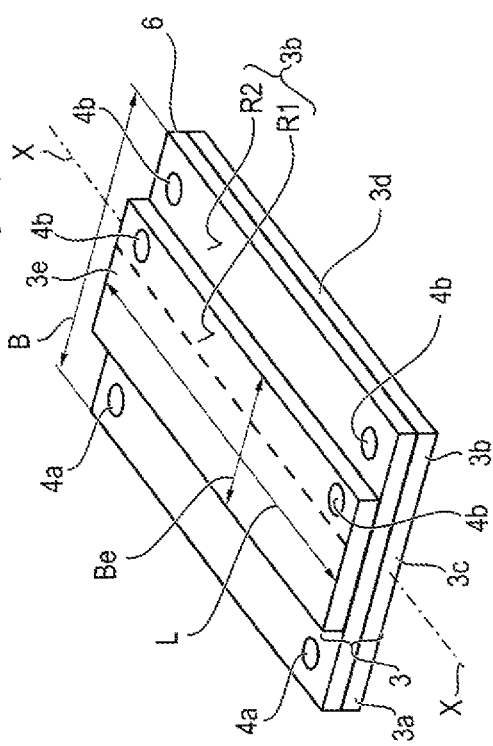
FIG. 3 shows in perspective view a second embodiment of an inventive sheathing.

The second embodiment of a sheathing 1 shown in FIGS. 3 to 5 differs from the first embodiment in that it has a two-layer carrier 3. On the adhesive layer 6 of the sheathing 1 according to the first embodiment, there is a second backing 3e, wherein the first backing corresponds to the entire carrier 3 in FIG. 1, in this embodiment is designated with the reference number 3d. The second backing 3e is here configured in a breadth Be, which is smaller than the breadth B of the first backing 3d.

The carrier 3 can advantageously have at least one backing 3d, 3e, which consists of polyethylene terephthalate (PET) or polyamide (PA) fabric. If high noise damping is required, at least one of the two backings 3d, 3e, preferably the second backing 3e, can be made from a material damping noise more strongly than a fabric, such as for example a fleece. Through a combination of a first backing 3d of PET or PA fabric with a second backing 3e made from a fleece, a high abrasion resistance and high noise damping capacity can simultaneously be achieved.

The second backing 3e extends over the entire middle region 3c of the carrier 3, but is somewhat larger in its breadth Be, so that on one side it still forms a part of the edge region 3b there, which can be designated as part R1 of the edge region 3b. The outer part R2 of this edge region 3b is here formed by the first backing 3d.

The backings 3d, 3e which overlay one another are connected together by an adhesive, which is the same one which in the first embodiment forms solely the adhesive layer 6. In the one edge region 3a and in the outer part R2 of the other edge region 3b, this is also free in the second embodiment of the invention. However due to the second backing 3e, on the sheathing 1 according to the invention, a central adhesive-free region is formed. After manufacture of the sheathing depicted in FIG. 5, the effect of this is that the sheathed product 2 and the middle region 3c of the carrier 3 lie upon an entirely adhesive-free inner side, which in particular—as already mentioned—is advantageous for the manufacture of highly flexible sheathing for large cable diameters, because it allows relative motion of the elongated product 2 and thus the cable with respect to the sheathing.

A further specific characteristic of the second embodiment of the sheathing 1 according to the invention is that two holes 4b in the other edge region 3b are associated with a hole 4a, which is in the edge region 3b in such a way that the holes 4a, 4b, by folding of the carrier 3 along or parallel to a main axis X-X extending through the middle range 3c of the carrier 3, or by bending of the carrier 3 around an axis Y-Y spaced apart from the carrier 3 and running parallel to this main axis X-X, can be caused to coincide with one another. Here a hole 4b in the inner, double-layer part R1 of the edge region 3b and a further hole 4b in the outer, single-layer part R2 of the edge region 3b are associated with a hole 4a in the first edge region 3a.

As is shown by the first installed state, depicted in FIG. 4, of the second embodiment of the inventive sheathing 1 for sheathing of the elongated product 2, the carrier 3 initially is again bent about the axis Y-Y that runs parallel to the main axis X-X, wherein the former is identical to the longitudinal axis of the elongated product 2. The—as shown in the first embodiment—two holes 4a in the one edge region 3a are caused to coincide with the two holes 4b in the inner part R1 of the other edge region associated with them. After that the outer part R2 of the second edge region 3b is folded onto the first edge region 3a, so that the additional two holes 4b lying within it are likewise caused to coincide with the two holes 4a of the first edge region 3a. Then, as is shown by the second installed state in FIG. 5, the fastening 7 can be inserted through the overlying holes 4b/4a/4b.

In the thus depicted fastening lug 5, the first edge region 3a is enclosed on the top and bottom by the inner part R1 and the outer part R2 of the second edge region 3b, and is bonded on the top and bottom by the adhesive layer 6 to the second edge region 3b. The outer edge K of the projecting lug is closed by the second edge region 3b at its boundary line between its inner part R1 and its outer part R2. Advantageously in this way no moisture and/or contamination can penetrate this site, wherein the sheathing, particularly fastening lug 5, is extremely stable, which is again advantageous for the installation of the sheathed elongated product 2 on additional components.

With the third embodiment shown in FIGS. 6 to 8 of a sheathing 1 according to the invention, just as with the second embodiment only a partially adhering sheathing can be provided for the elongated product 2, but in contrast to the first and second embodiment, without a lateral fastening lug 5.

Toward this end, when the carrier 3 is bent to produce the sheathing about the longitudinal axis Y-Y of the product 2, in order to align the holes 4a, 4b associated with one another in the edge regions 3a, 3b, the edge regions 3a, 3b are not placed opposite the side where the adhesive layer 6 is located, but after the fastener 7 before arching of the carrier 3 was inserted through a hole 4a in an edge region 3a, this edge region 3a is bonded by means of the adhesive layer 6 on it to the product 2 that is to be sheathed. This is the first installed state depicted in FIG. 7.

After the bending of the product 2 by the sheathing 1 according to the invention, the holes 4b in the other edge region 3b are guided over the fastener 7, and the second edge region 3b is bonded using its adhesive layer 6 to the back of the edge region 3a already bonded to the product 2, as shown by the second installed state in FIG. 8. The advantage of this third embodiment is that no lug 5 projects from the sheathed product 2, which is particularly advantageous with displacement of the sheathed product 2, when there is little installation space available. Elasticity, flexibility, and flagging of the sheathing according to the invention here play only a subordinate role, because closure is effected not only by adhesion, but also by the fastener 7, which in particular secure the second edge range 3b.

The perspective depiction in FIG. 9, which shows a fourth embodiment of the sheathing 1 according to the invention, illustrates that the adhesive layer 6 need not be applied over the full surface, but can also be applied in discrete adhesive layer regions 6a, 6b, for example on the edge regions 3a, 3b. The adhesive layer regions 6a, 6b during installation, by analogy with a full-surface adhesive layer 6, can either be bonded to a fastening lug 5—as in FIG. 2—or in the manner of the third embodiment depicted in FIGS. 7 and 8. The middle region 3c of the carrier 3 remains clear of adhesive.

Additional embodiments not depicted here by the Figures can include such adhesive layer regions also on the opposite sides of the carrier 3, or an adhesive coating can be applied only to one edge region 3a, 3b.

The fifth embodiment of a sheathing 1 according to the invention as shown in FIGS. 10 to 12 is one that is configured in a less expensive manner without any adhesive layer 6 at all and is suited for production of a non-adhesive sleeve for the product 2 to be sheathed. By analogy with the second embodiment shown in FIGS. 3 to 5—but now without adhesion—a lateral fastening lug 5 is formed on the sheathed product 2. The cohesion of the edge regions 3a, 3b can be assured solely by the fastening 7.

Also the sixth embodiment of the sheathing 1 depicted in FIGS. 13 to 15 shows a sheathing without the adhesive layer 6. Here by analogy with the third embodiment shown in FIGS. 6 to 8 the product 2 is sheathed without formation of a lateral fastening lug 5, and by analogy with the fifth embodiment, again without adhesion.

In the embodiments depicted in FIGS. 16 to 21, a length L of the sheathing 1 running in the direction of the main axis X-X is no larger than a breadth B of the sheathing running in the direction of the main axis X-X, whereby the sheathing 1 can form a fastening clamp B for the elongated product 2. This is shown in FIG. 20, which by way of example shows an installed state of the tenth embodiment by of a reference S in parentheses next to the reference number 1 in the drawing.

Furthermore, it is characteristic of the seventh to the tenth embodiments that only one hole 4a, 4b lies in each edge region 3a, 3b. In terms of its being equipped with an adhesive layer 6, the form of the edges 3a, 3b and the middle region 3c, as well as the installation type, otherwise the seventh embodiment corresponds to the sixth embodiment (without adhesive layer 6), the eighth embodiment corresponds to the third embodiment (with adhesive layer 6), and the ninth embodiment corresponds to the second embodiment as regards the two backings 3d, 3e present in the sheathing 1 according to the invention. The ninth embodiment however is installed like the first or the third embodiment.

The distinctiveness of the tenth embodiment is that one of the holes 4b is configured as an elongated hole. For the rest, the sheathing 1 according to the invention are configured just as that of the eighth embodiment in FIG. 17. Due to the elongated hole, it is advantageously possible to form the service region of the sheathing 1 according to the invention in a more universal manner in that it can be used for different diameters of the product 2 that is to be sheathed.

The same advantage is also associated with the eleventh embodiment of a sheathing 1 according to the invention shown in FIG. 21. However instead of the elongated hole, this provides that in the sheathing 1—similarly to in the second and fourth embodiment—in each case more than one hole 4b in the other edge region 3b is associated with a hole 4a, which is located in the one edge region 3a. This association however is not primarily for formation of a fastening lug 5, as shown in FIGS. 5 and 12, but makes it possible that using the fastening 7 during installation, a belt-like closure of the sheathing can be effected for, fitting to the diameter of the product 2.

Thus the hole or holes 4a, 4b can be produced by punching in, punching out or in some other suitable manner.

For example FIG. 21 also illustrates that a tape 10 can be formed advantageously from a number of sheathings 1 according to the invention, to which likewise inventive significance is attached. In this tape 10, the sheathing 1 lie in each case next to one another, wherein the middle regions 3c of the carrier 3 form the tape center, and the edge regions 3a, 3b of the carrier 3 form the tape edges.

Sheathing 1 lying next to one another can be separated from one another here by a perforation, by a cut or punched edge 12, or even by a split. The sheathing 1 can here—as shown—be disposed on a siliconized liner 14.

Such a tape, when the sheathing 1 are separated from one another by a cut or punched edge 12 or by a split, with a liner 14, and when the sheathing 1 are only separated from one another in each case by a perforation, also without a liner 14, can be wound up into a roll. In this way an improved storage and transport capability as well as a simple processability are provided for the sheathing 1 according to the invention.

The typical values for the specific thickness and the specific weight of the carrier 3 or its backings 3d, 3e strongly depend on the material. Possible reduced bendability or flexibility of the carrier 3 can be compensated for only by a smaller selected thickness D.

For foils, a range of carrier thickness (shown only in FIG. 9 with the reference number D) of around 20 μm to 300 μm must be viewed as typical, wherein the thicknesses D of PET and aluminum foils are more in the lower range (lower than 160 μm) and the thicknesses D of PVC and PE foils are more in the upper range (over 160 μm).

Carriers 3 made from fabric are usually characterized by their surface weight and the thread configuration. The surface weight can preferably be in a range of 50 g/m$^2$ to 300 g/m$^2$, wherein the fabric can have between 15 and 80 warps and between 10 and 50 wefts, and the titer of the threads can lie in the region of 50 dtex to 500 dtex.

While the above description constitutes the preferred embodiment of the present invention, it will be appreciated that the invention is susceptible to modification, variation and change without departing from the proper scope and fair meaning of the accompanying claims.

The invention claimed is:

1. A sheathing for an elongated product, including an electrical cable set comprising, a foldable, windable, bendable, or at least flexible carrier having a middle region which is used for lying against the product and is delimited on both sides by first and second edge regions, of the first edge region, there is at least one first hole, wherein the first hole in the first edge region is associated with at least one second hole in the second edge region in such a way that by folding the carrier along or parallel to a main axis running through the middle region of the carrier, or by bending or flexing the carrier about a second axis spaced from the carrier extending parallel to the main axis, the first and second holes configured to coincide, wherein the carrier contains a woven fabric having a surface weight in the range between 50 g/m² and 300 g/m² and having between 15 and 80 warps and between 10 and 50 wefts, and threads of the woven fabric having titer in the range between 50 dtex and 500 dtex, wherein the carrier at least on one side is coated over the full surface or in areas with an adhesive layer by a pressure-sensitive adhesive, the pressure-sensitive adhesive being a rubber adhesive or an acrylate adhesive, or a UV cross-linked acrylate adhesive, the pressure-sensitive adhesive being a pplied with a surface weight in the range of 60 g/m² to 110 g/m².

2. A sheathing according to claim 1, wherein there is a plurality of the first holes in the first edge region, which form pairs with a plurality of the second holes in the second edge region which first and second edge regions are associated in an axisymmetric manner.

3. A sheathing according to claim 1, wherein one of the at least one first hole that is located in the first edge region is respectively associated with two or more of the second holes in the second edge region such that by the folding of the carrier, the first and second holes can be caused to coincide with one another.

4. A sheathing according to claim 1, wherein the first and the second holes are punch holes.

5. A sheathing according to claim 1, wherein at least one of the first and the second holes is configured as an elongated hole.

6. A sheathing according to claim 1, wherein the carrier is configured in two or more layers, wherein at least one of the layers is made of textile fabric.

7. A sheathing according to claim 6, wherein the layers overlie one another and are connected to one another by a pressure-sensitive adhesive.

8. A sheathing according to claim 1, wherein the carrier has a backing, which is composed of a polyethylene terephthalate or a polyamide fabric.

9. A sheathing for an elongated product, including an electrical cable set comprising, a foldable, windable, bendable, or at least flexible carrier having a middle region which is used for lying against the product and is delimited on both sides by first and second edge regions, of the first edge region, there is at least one first hole, wherein the first hole in the first edge region is associated with at least one second hole in the second edge region in such a way that by folding the carrier along or parallel to a main axis running through the middle region of the carrier, or by bending or flexing the carrier about a second axis spaced from the carrier extending parallel to the main axis, the first and second holes configured to coincide, wherein the carrier contains a foil with a thickness of 20 µm to 300 µm and the carrier at least on one side is coated over the full surface or in areas with an adhesive layer by a pressure-sensitive adhesive, the pressure-sensitive adhesive being a rubber adhesive or an acrylate adhesive, or a UV cross-linked acrylate adhesive, wherein the pressure-sensitive adhesive is applied with a surface weight in the range of 20 g/m² to 70 g/m².

\* \* \* \* \*